US010612792B2

(12) United States Patent
Ferrari Aggradi (10) Patent No.: US 10,612,792 B2
(45) Date of Patent: Apr. 7, 2020

(54) AIR CONDITIONING SYSTEM, PERIPHERAL AIR-CONDITIONING UNIT THEREOF AND WATER PIPELINE UPGRADING METHOD FOR HEATING PURPOSES

(71) Applicant: Walter Ferrari Aggradi, Monticello Brianza (IT)

(72) Inventor: Walter Ferrari Aggradi, Monticello Brianza (IT)

( * ) Notice: Subject to any disclaimer, the term of this patent is extended or adjusted under 35 U.S.C. 154(b) by 458 days.

(21) Appl. No.: 15/038,628

(22) PCT Filed: Nov. 21, 2014

(86) PCT No.: PCT/EP2014/075322
§ 371 (c)(1),
(2) Date: May 23, 2016

(87) PCT Pub. No.: WO2015/075199
PCT Pub. Date: May 28, 2015

(65) Prior Publication Data
US 2016/0298860 A1   Oct. 13, 2016

(30) Foreign Application Priority Data

Nov. 22, 2013 (IT) ............... 2013A001947

(51) Int. Cl.
*F24D 3/18* (2006.01)
*F24D 3/10* (2006.01)
(Continued)

(52) U.S. Cl.
CPC ............. *F24D 3/18* (2013.01); *F24D 3/1058* (2013.01); *F24D 19/1024* (2013.01);
(Continued)

(58) Field of Classification Search
CPC ............. F24F 1/0007; F24F 2001/0077; F24F 2001/0074; F24F 5/0007; F24F 3/08; F25B 29/003; F25B 29/00; F25B 30/02; F25B 25/005; F25B 2313/02741; F25B 2400/0409; F25B 2313/004; F25B 49/027; B60H 1/03; B60H 1/004; F24D 3/02; F25D 2600/2501; Y02B 30/545
USPC ................... 165/230; 62/181, 183
See application file for complete search history.

(56) References Cited

U.S. PATENT DOCUMENTS 5,370,307 A * 12/1994 Uehra ............... F24F 3/001
237/2 B
2009/0120629 A1 * 5/2009 Ashe ............... B01J 19/0013
165/181

(Continued)

FOREIGN PATENT DOCUMENTS

GB   2 247 072 A   2/1992
GB   2 460 888 A   12/2009

OTHER PUBLICATIONS

International Search Report, dated Jan. 22, 2015, from corresponding PCT application.
(Continued)

*Primary Examiner* — Marc E Norman
*Assistant Examiner* — Schyler S Sanks
(74) *Attorney, Agent, or Firm* — Young & Thompson (57) ABSTRACT

An air-conditioning system, for a pre-installed heating system equipped with a circulating network of a primary heat exchange fluid between a central unit and a plurality of peripheral units of heat exchange with the environment air, wherein the central unit includes a heat source/well for heat adjusting the primary heat exchange fluid in a range between a hot temperature and a cold temperature lying above the current dew temperature, the peripheral units including active fan coil units, having at least one refrigerating-fluid section, with a closed circuit including a first batch of fluid/air heat exchangers, and a heating section with a second batch of fluid/air heat exchangers, and wherein a supply portion and a return portion of the circulating network are connected to the second batch of heat exchangers and to a third fluid/fluid heat exchanger connected to the closed circuit of the refrigerating fluid section.

12 Claims, 5 Drawing Sheets

(51) Int. Cl.
*F24D 19/10* (2006.01)
*F24F 3/06* (2006.01)
*F24F 1/0007* (2019.01)

(52) U.S. Cl.
CPC .............. *F24F 1/0007* (2013.01); *F24F 3/06* (2013.01); *Y02B 30/12* (2013.01)

(56) References Cited

U.S. PATENT DOCUMENTS

| | | | | |
|---|---|---|---|---|
| 2009/0288437 | A1* | 11/2009 | Matsuoka | F24F 3/06 62/238.6 |
| 2010/0326624 | A1* | 12/2010 | Hancock | F24F 3/0442 165/47 |
| 2012/0125028 | A1* | 5/2012 | Keisling | H05K 7/20827 62/228.1 |
| 2012/0204588 | A1* | 8/2012 | Takenaka | F25B 13/00 62/238.7 |
| 2012/0255318 | A1* | 10/2012 | Kido | F25B 31/006 62/126 |

OTHER PUBLICATIONS

IT Search Report, dated May 2, 2014, from corresponding IT application.

* cited by examiner

AIR CONDITIONING SYSTEM, PERIPHERAL AIR-CONDITIONING UNIT THEREOF AND WATER PIPELINE UPGRADING METHOD FOR HEATING PURPOSES

FIELD OF THE INVENTION

The present invention relates to an air-conditioning system of a building and to a peripheral air-conditioning unit thereof; in particular, the invention, relying on an innovative plant and air-conditioning unit, also relates to an upgrading method of a water circulating heating system, in order to obtain summer air-conditioning, too.

BACKGROUND ART

It is known that systems for room air-conditioning, typically in rooms of small and large buildings, essentially consist of a series of terminal devices (fan-coils or fan coil units), intended to perform the heat exchange with environment air, which are supplied with cold water (in summertime) or hot water (in wintertime) produced by centralised systems (refrigeration units, heat generators, or the like).

When building from scratch, these systems are fitted with water circulating networks specifically conceived for this function, hence coated with insulating and steam-barrier products, capable of preventing condensation from water vapour on the outer surface thereof. This coating, in addition to evident reasons of dissipation reduction, is essential and indispensable in order to:

prevent the water produced by said condensation water vapour phenomena from causing seepage and damages to the surrounding building structures, safeguard duration in time of the metal pipes, minimising the corrosion effects induced by rust formation.

Moreover, not less important but of more accessible solution, systems suitable for summer air-conditioning also have an integrative pipe system intended for the disposal of the condensation water which collects on the cold surfaces of the heat exchangers of the terminal units.

By contrast, for what concern the majority of existing buildings, intended for human occupation (residential housing, offices, schools, etc.), the relative water systems for fluid distribution are designed solely for transporting heating fluid; due to aesthetic requirements, fluid transport pipes are typically embedded in the walls, hence hardly reachable unless demolition actions are taken.

These water systems for conventional heating typically do not meet the above-described insulation and water vapour barrier requirements, and are hence unsuitable for being converted to the transfer of cooling fluid for the summer conditioning regimens. For such reason, should one not want to provide to the reconstruction of the original systems or to the installation of parallel air-conditioning systems—an often unacceptable choice due to the nuisance caused and to the particularly high costs involved—it is not possible to install a centralised air-conditioning system, but it is necessary to accept the compromise of installing a certain number of individual independent units (air-conditioning split or multi-split units fitted with external air condensation units, with water coolers where condensation is obtained through cool disposable drinking water, etc.).

Also, these independent units comprise evident disadvantages, since they generally have:

significant purchase and installation costs, remarkable running costs, both in terms of energy efficiency and of maintenance requirements;

an increase of electric load distributed on the electric systems of the estate units, a possible external functional impact, determined by hot air discharge towards the surrounding areas, as well as an objective visual environmental impact detrimental to the external architectonic appearance of the building.

It would instead be desirable to be able to develop a centralised system, so as to avoid the drawbacks linked to the independent units, which, however, reduces as far as possible the need for actions on the existing fluid circulating network of the building.

GB2247072 discloses an air-conditioning system having a heating system equipped with a distribution pipeline of a primary heat-exchange fluid between a central unit and a plurality of peripheral units for heat exchange with the environment air. This system however relies on a specific distribution pipeline and cannot be adapted to a pre-existing traditional circulating network for heating fluid.

SUMMARY OF THE INVENTION

The fundamental object of the present invention is hence the reuse—in its "as is" condition—of an existing water circulating network of a heating system in buildings—equipped with not-properly isolated pipelines—for configuring an air-conditioning system effective both in wintertime and in summertime, without problems linked to the lack of insulation or of vapour barrier arising.

More precisely, it is the object of the present invention to propose a technical solution which overcomes the described problems and which, in particular:

facilitates the need to pursue the dissemination of better environmental climate conditions in buildings occupied by humans, even not technically prepared, at a limited cost, allows to reuse and upgrade existing system structures (water circulating network) avoiding the radical, burdensome and invasive demolition and replacement thereof, allows to accomplish energy savings resorting to thermal compensation principles between different-requirement areas and/or resorting to the use of renewable energies (for example geothermal heat pump).

These objects are achieved through the features mentioned in the independent claims herewith attached. The dependent claims describe preferential features of the invention.

In particular, according to a first aspect of the invention, it is provided an air-conditioning system applied to a pre-installed heating system equipped with a circulating network of a primary heat exchange fluid between a central unit and a plurality of peripheral units exchanging heat with the environment air, wherein said central unit comprises a heat source/well for heat adjusting said primary heat exchange fluid in a range between a hot temperature and a cold temperature, said cold temperature lying above the current dew temperature, said heat exchange peripheral units consist of active fan coil units, comprising at least a refrigerating fluid section, with a closed circuit in which a first batch of fluid/air heat exchangers is inserted, and a heating section with a second batch of fluid/air heat exchangers, and a supply portion and a return portion of said circulating network, in which said primary heat exchange fluid circulates, are connected to said second batch of heat exchangers and to a third fluid/fluid heat exchanger connected to the closed circuit of said refrigerating-fluid section.

According to a further aspect, a valve is furthermore provided, arranged so as to allow or prevent the circulation of said primary heat exchange liquid in said second batch of heat exchangers.

Additionally, said closed circuit of the refrigerating-fluid section furthermore comprises, in sequence, at least a lamination valve, said third fluid/fluid heat exchanger and a compressor.

Preferably, said refrigerating-fluid section furthermore comprises a switching valve suitable to switch the direction of the refrigerating fluid in the closed circuit to cause it to flow into said first batch of heat exchangers alternatively upstream or downstream of said lamination valve of the refrigerating fluid so as to perform a heating heat pump cycle or refrigerating cycle, respectively.

It is further provided a calorie-counting device arranged between a supply terminal and a return terminal of said supply portion and return portion, respectively, to and from said active fan coil unit.

Preferably a supplementary fan, apt to increase the heat exchange with the environment air in the proximity of said first and second batches of heat exchangers, is furthermore provided.

According to an original aspect of the invention, a detection device of the dew point temperature in the environment air is provided, apt to control a heat adjustment action of said central unit so that the low temperature of said primary heat exchange fluid is continuously adjusted to be kept above the current dew temperature.

According to another aspect of the invention, a fan coil unit is provided, for heat exchange with environment air in a system as above, comprising at least a refrigerating-fluid section, with a closed circuit wherein there are inserted, in sequence, a first batch of fluid/air heat exchangers, at least one lamination valve, a third fluid/fluid heat exchanger and a compressor, as well as a heating section with a second batch of second fluid/air heat exchangers, wherein it further comprises an entry and an exit of primary heat exchange fluid, connected to said second batch of heat exchangers and to said third fluid/fluid heat exchanger connected to the closed circuit of said refrigerating fluid section, the primary heat exchange fluid circulating at a hot temperature and a cold temperature depending on the operating regime, the cold temperature being above the dew point temperature of the environment.

Preferably a supplementary fan apt to increase the heat exchange with the environment air in the proximity of said first and second batches of heat exchangers is furthermore provided in said unit.

According to a further aspect of the invention, it is provided a building method of an air-conditioning system, comprising the step of upgrading a pre-installed heating system provided with at least a circulating network of a primary heat exchange fluid between a central unit having a heat source and a plurality of peripheral units for heat exchange with the environment air, comprising the steps of:

removing at least part of said peripheral units and replacing them with an active fan coil unit as above, providing said central unit also with a heat well for heat adjusting said primary heat exchange fluid in a range between a hot temperature and a low temperature, said low temperature lying above the current dew temperature.

BRIEF DESCRIPTION OF THE DRAWINGS

Further features and advantages of the invention will become in any case more evident from the following detailed description of a preferred embodiment, given purely as a non-limiting example and illustrated in the attached drawings, wherein.

DETAILED DESCRIPTION OF A PREFERRED EMBODIMENT

Firstly it is pointed out that the fundamental object of the present invention is to allow the installation of an air-conditioning system exploiting the most of pre-existing, conventional (i.e. with a pipeline without specific insulation or vapour barrier components) heating systems, that is with hot water circulating pipes, so as to reduce to a minimum the economic impact and the impact of demolition operations. As a matter of fact, conventional heating systems already provide a network of supply pipes, installed and embedded in the concrete and masonry works, which define at least a hot water supply circuit and a return circuit from and to a central hot water generator (central generator for an entire building, or even for a single flat) and a plurality of radiators or possibly of fan-coils (liquid/air exchangers).

The existing conventional distribution network for hot water in a heating system is typically not provided with adequate insulations or vapour shields to be able to be used for the circulation of the cooling medium typically employed in conventional summer air-conditioning systems.

According to the invention, a layout suitable to maintain fully unchanged the original supply pipe network is provided instead, to maintain possibly unchanged the hot water central generator, through a simple replacement of the terminal units and of few other control members, as better described in the following.

An original feature of the invention is to exploit the water circulating network to cause a primary heat exchange liquid, typically water, but also other suitable fluids, to circulate at a minimum temperature of 25-30° C., between a central heat generator/well (i.e. an apparatus having the capability to both deliver heat and withdraw heat to and from the working liquid) and a plurality of peripheral units in the form of active fan coil units (liquid/air exchangers), suitably configured, in turn provided with an independent circuit for a secondary heat exchange fluid.

The general layout of the components will be presented in the following, resorting to the schematic circuit shown in the attached drawings, of which the various operating modes will be illustrated later.

In a suitable position of the building, such as a boiler room or a large room of a flat, a central heat treatment unit is installed (not shown in the drawings), capable of cooling (water refrigerator or heat well) or heating (heat generator or heat source) the primary heat exchange liquid circulating in the existing circulating pipeline network. For example, the central unit works like a classic heat pump. This central heat unit is connected to the ends of the circulating network, in particular to the supply side M and to the return side R of the plant.

Whenever an efficient central generator of hot water is already available, of the boiler type with a gas burner or the like, a central refrigerator of the heat exchange liquid (primary fluid of the system) must be arranged side by side thereto. In this case a central distribution valve must also be arranged for alternatively connecting the hot water central generator or the central liquid refrigerator, respectively, to the circulating network of the primary fluid. However, if the central generator is a heat pump system, said pump is already capable of supplying hot water or cold water, respectively, and hence no further generator is necessary but to perform emergency operating functions or heat integration functions.

Such a heating and refrigerating unit thus arranged is capable of introducing in the circulating network either a hot fluid (for example water) (with temperatures ranging between 37° C.—as in medium-temperature systems—and at least 60° C.—as in systems with high-temperature radiators) or a substantially cold fluid (typically water) and in any case at a temperature not below 20° C. (or not below the environment dew temperature).

In correspondence of chosen cooling/heating locations of the building, peripheral heat exchange units are installed. Should the pre-installed existing system have a plurality of radiators, they are replaced by the peripheral heat exchange units; in case the pre-installed existing system is of the medium-temperature radiating-panel type, suitable exposed branches must be arranged to which to connect the peripheral heat exchange units.

According to the invention, the peripheral heat exchange units are in form of active fan coil units, as better described here in the following.

Figure 1:
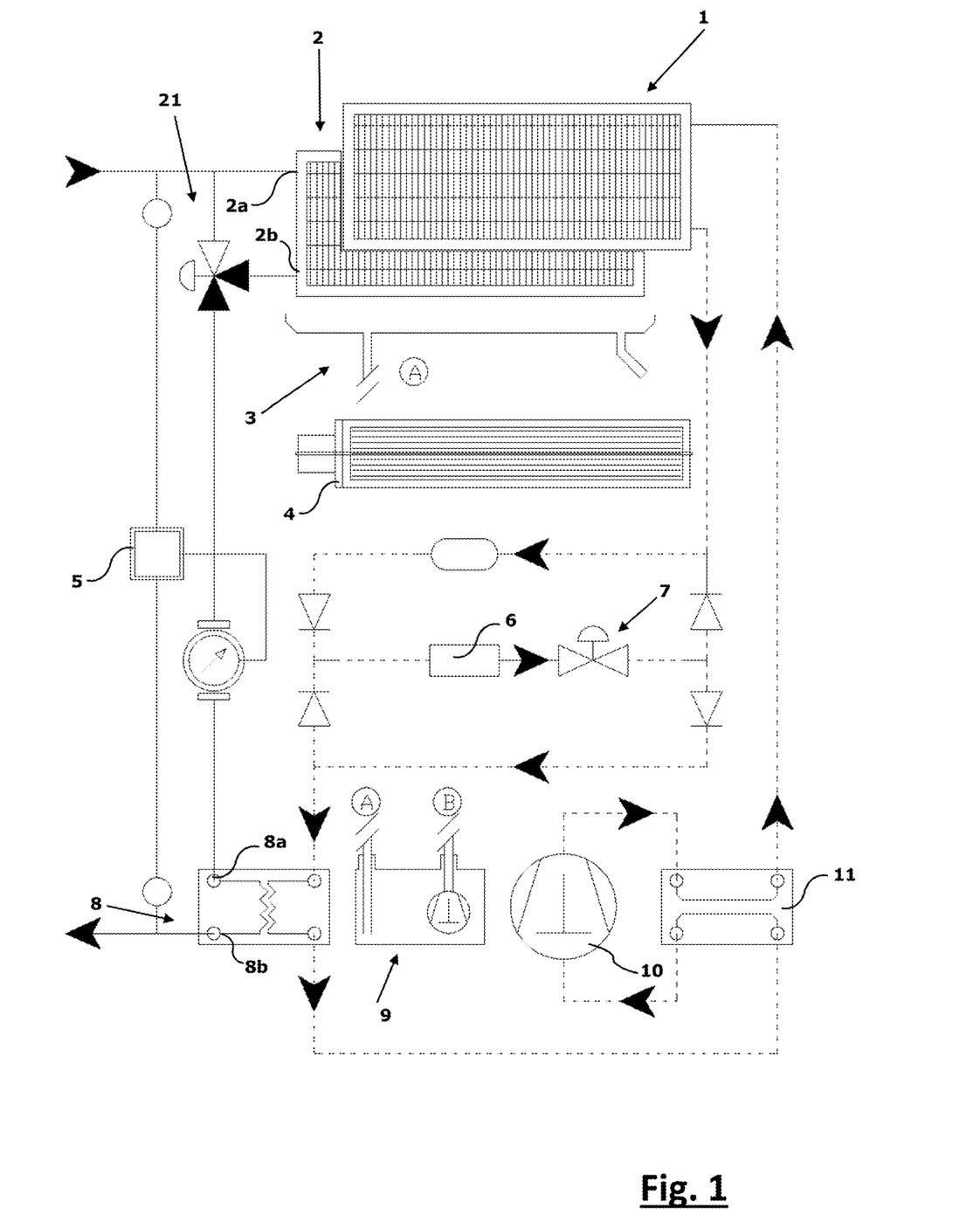
FIG. 1 shows a system diagram of the invention in conditions of use for a winter heating cycle.

As shown in the diagram of FIG. 1, an active fan coil unit according to the present invention comprises:

two heat exchange batches 1 and 2 and, more precisely, a gas/air (or, better said, fluid/air) direct expansion exchange batch 1, and a hydronic batch 2 for water/air (or, better said, liquid/air) exchange; to these two exchangers an underlying tray 3 is associated, or other equivalent known device for collecting and/or draining condensation water; a fan is not strictly required—despite the conventional definition of 'fan coil unit'—since heat exchange between the exchange batches and the environment air can be carried out through simple convection; however, a venting system 4 is preferably also provided, for example a tangential fan, for facilitating heat exchange;

a treatment unit of the refrigerating fluid, in communication with fluid/air exchanger 1, comprising at least a thermostatic lamination valve 7 and a compressor 10 of the refrigerating gas;

a four-way valve 11, for the inversion of the cycle of the cooling fluid;

a liquid/gas-liquid plate heat exchanger 8, suitable for exchanging heat between the primary heat exchange liquid and the refrigerating fluid (in a gaseous or generally fluid condition).

Advantageously an electrically-controlled hydraulic valve 21 is also provided, suitable to exclude the operation of liquid/air exchanger 2 in the operation regimen for summer air-conditioning (as will be better shown further on).

Furthermore, a filter for refrigerating gas 6 may possibly be provided, as well as a tank 9 for collecting condensation water, coming from collection device 3, and a calorie-counting device 5, the usefulness of which will be illustrated in the following.

All these components are shown in the diagram of the active fan coil unit, which is identical in each one of FIGS. 1 to 5, in which it can be noticed that the first gas/air heat exchanger batch 1 belongs to the circuit of the refrigerating fluid (secondary heat exchange fluid), while the second liquid/air heat exchange batch 2 belongs to the circuit of the primary heat exchange fluid. The two primary and secondary heat exchange fluids can mutually exchange heat through the third (plate) heat exchanger 8.

The operation of such terminal unit is now going to be described, with reference to the different cycle conditions provided.

Heating in Winter Phase

FIG. 1 shows the active fan coil unit in the operating condition typical of the winter phase.

In this case the service is totally and exclusively ensured by the primary heat exchange fluid produced (conventionally or from renewable energies) by the central unit for producing thermal energy. In the central unit the sole systems for hot fluid production (for example the burner of a gas boiler) are kept active, which allow the central system to feed the circulating network with a high-temperature primary heat exchange fluid; by "high temperature" the operating temperature as established in the project for the terminal peripheral units making up the original equipment of the building (for example radiators, radiating panels, conventional fan coil units, or the like) shall be understood, hence a temperature ranging from about 25° C. to about 70° C. depending on the type of terminal and on the existing climate conditions.

The circulating network of the primary fluid may be fed by the central heat generating unit or by a non-conventional hot water production system, for example with systems known per se, such as:

one (or more) high-efficiency and/or condensation heat generators;

one (or more) geothermal or hot-air heat pumps (or similar devices);

one (or more) district heating systems.

The pre-installed existing circulating network, planned specifically for this type of winter phase temperature, may operate, for example, on two different temperature levels, according to chosen time windows, capable of ensuring a comfort regimen and an attenuated reduced regimen. This double temperature regimen may be governed by an electronic temperature adjustment unit, known per se (a typical compensated climate adjuster).

The control of the environmental conditions within each individual room (wherein one or more peripheral thermal units insist) may be entrusted only to the active fan coil unit according to the invention—to be installed as a replacement of the existing peripheral units (fan coil for heat only, conventional radiator, etc.)—or jointly to the active fan coil unit and to the existing devices (conventional fan coil units, radiating panels, radiators, etc.).

The "active fan coil unit" of the system according to the invention, shown in FIG. 1 in the winter operating conditions and in a comfort regimen, resorts to the exclusive use of the primary heat exchange fluid and of the second heat exchange batch 2. In particular, the hot fluid coming from the supply pipe A of the circulating network, enters from an entry 2a of exchanger 2, circulates therein and then goes out from an exit 2b connected to a return branch R of the circulating network. Exchanger 2 exchanges heat with the environment air; the effectiveness of the heat exchange is controlled and improved by ventilation unit 4, with a mode known per se.

Between the second liquid/air heat exchanger 2 and the supply branch M and the return branch R of the circulating network, an opening/closing valve 21 is provided, automatically controlled by the adjustment system of the active fan coil unit.

As seen, according to a preferred embodiment, at the supply terminal M and at the return terminal R of the circulating network, a calorie-counting device 5 is installed, suitable for determining the amount of calories delivered to or received by the single terminal active fan coil unit, for the purpose of accounting and punctual sharing of the operating costs between the individual users of the system. In other words, through calorie-counting device 5 it is possible to detect how many calories have been locally exchanged between the primary heat exchange fluid, delivered in the circulating network, and the single active fan coil unit.

According to an essential feature of the invention, the circuit of the primary fluid, between supply M and return R, passes also through the third heat exchanger 8, preferably of the plate type for fluid/fluid heat exchange. In particular, the primary heat exchange fluid enters from the primary entry 8a of the third heat exchanger 8 and exits from primary exit 8b before directing itself towards the return branch R of the circulating network. Through the third heat exchanger, the primary fluid and the secondary fluid exchange heat each other.

In this operating condition any other device section, including devices 3 and 9 for condensation water recovery, is excluded and isolated from the functional cycle.

It is interesting to point out that in this operating condition it is hence possible to exclude and fully remove the entire refrigerating section/heat pump (that is, the assembly of parts 1, 6, 7, 8, 9, 10 and 11) which is cooperating with the first gas/air heat exchanger 1, safeguarding the integrity of the gas circuit, to provide to the execution of annual maintenance activities. Arranging these devices, including the first heat exchanger 1, on own fastening members independent from the hydronic heating section (consisting at least of the second heat exchanger 2, of the relative valve 21, of fan 4 and of calorie-counting device 5) which is physically connected to the circuit (circulating network) of the primary heat exchange fluid, it is possible to easily disassemble the inactive section for ordinary or extraordinary maintenance.

Heating in Winter Phase at Attenuated Regimen

FIG. 2 shows again an operating condition typical of the winter phase, however, in a condition of the heating cycle integrated with a heat pump.

Figure 2:
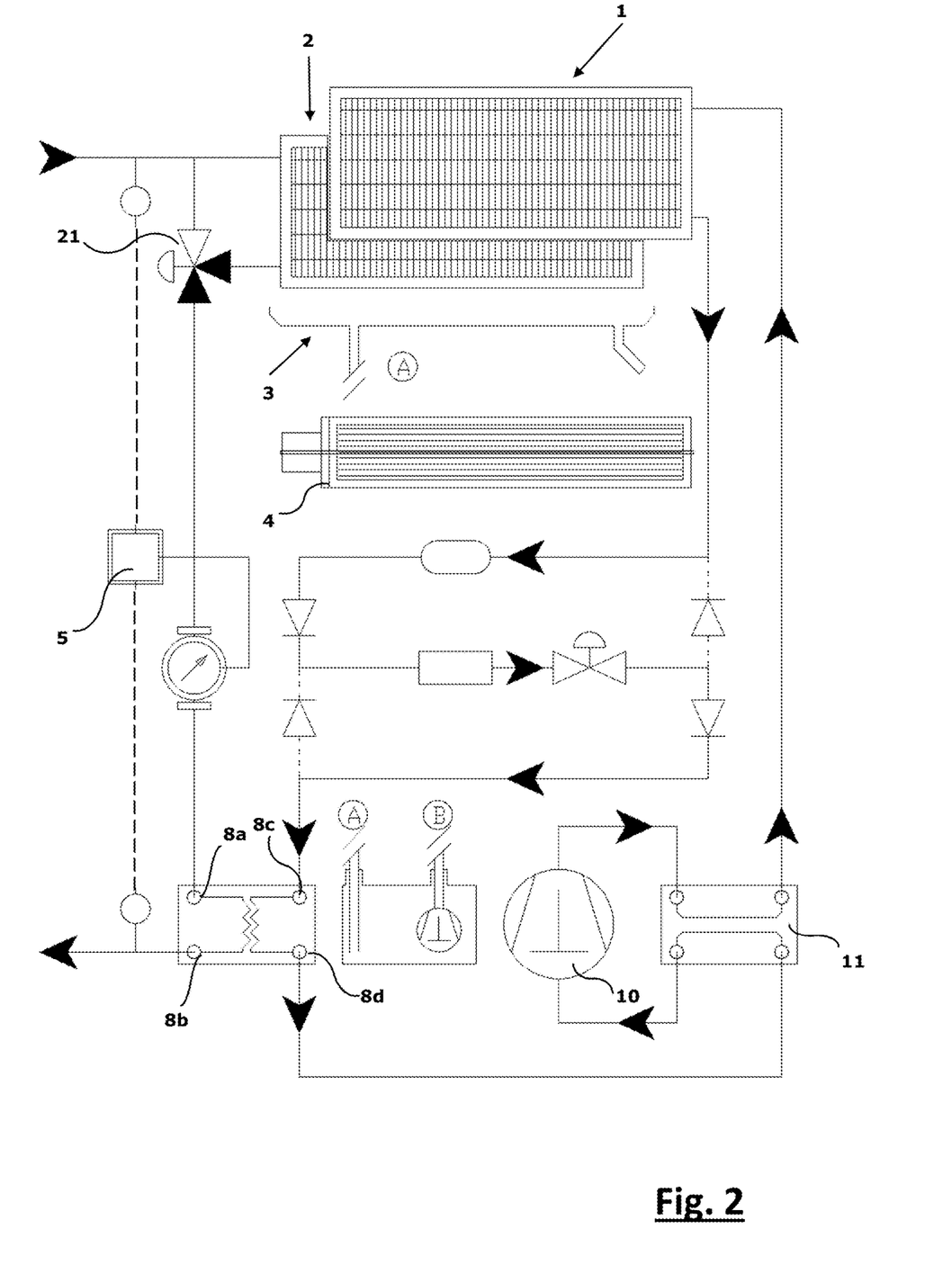
FIG. 2 shows the same system diagram of FIG. 1, in conditions of use for a winter heating cycle integrated with a heat pump.

When the central heat generating unit, as already mentioned, works with adjustment values at an attenuated reduced regimen, it may be useful —at least in some areas of the building—to carry on heat integration cycle at peripheral level, i.e. using the active fan coil unit in heat pump mode. This cycle is useful not only when the central heat generating unit is operating at an attenuated or defective regimen, but also when it is originally designed to deliver heat to medium-temperature systems (with radiating panels embedded in the floor, for example), wherein the radiating devices have been fully or partly abandoned and replaced, resorting to the use of the active fan coil unit of the invention.

In both these cases (or other similar ones), the central unit for the generation and distribution of thermal energy operates with medium-temperature regimens, insufficient for guaranteeing full and comfortable winter air-conditioning.

In this operating mode, the section in which the refrigerating fluid circulates—provided with the first gas/air heat exchanger 1—operates as heat pump and hence provides to the covering of the complementary requirement. In such circumstances, with obviously different individual weights, proportions and costs, the user can, on the one hand, benefit from all the energy supply provided by the central unit through the hydronic section 2 of the active fan coil unit (in the heating mode seen above with reference to FIG. 1) as well as being able, on the other hand, to integrate the further necessary heat part by resorting to the use of the section employing refrigerating fluid in the heat pump regimen.

The section employing refrigerating fluid comprises the first gas/air heat exchange batch 1 which, in the heat pump regimen, is fed by the refrigerating fluid circulating in the closed circuit heated by the same medium-hot primary fluid. In particular, in this condition, four-way valve 11 is set so as to cause the refrigerating fluid to circulate downstream of compressor 10, initially in the first heat exchange batch 1 and then in lamination valve 7.

The refrigerating fluid flows through lamination valve 7—after having gone through a filter 6—and arrives in a gaseous condition inside the third heat exchanger 8, entering from secondary entry 8c and leaving from secondary exit 8d. The refrigerating gas is thus heated at the temperature (less the exchanger losses due to a finite efficiency) of the primary heat exchange fluid: in this condition heat exchanger 8 acts as evaporator of the refrigerating cycle. The refrigerating fluid is then compressed by refrigerating compressor 10, until it is further heated to the liquid condition before entering the first heat exchange batch 1, where heat exchange with the environment air occurs (in a way aided by fan 4). Coming out from the first heat exchange batch 1, the refrigerating fluid at the liquid state is laminated by valve 7 and turns again to the gaseous condition with heat subtraction from the third heat exchanger 8, and so on.

This operating condition as a heat pump hence subtracts heat from the primary fluid, through the third heat exchanger 8, and supplies it to the environment through the first batch of heat exchanger 1. The abundant availability of calories which can be obtained from the primary heat exchange fluid (at a temperature above the dew point), does not produce a temperature lowering of heat exchanger 8 (acting as evaporator) below the dew temperature, so that no condensation is produced and no collector of condensation water is necessary.

Cooling in Summer Phase

Figure 3:
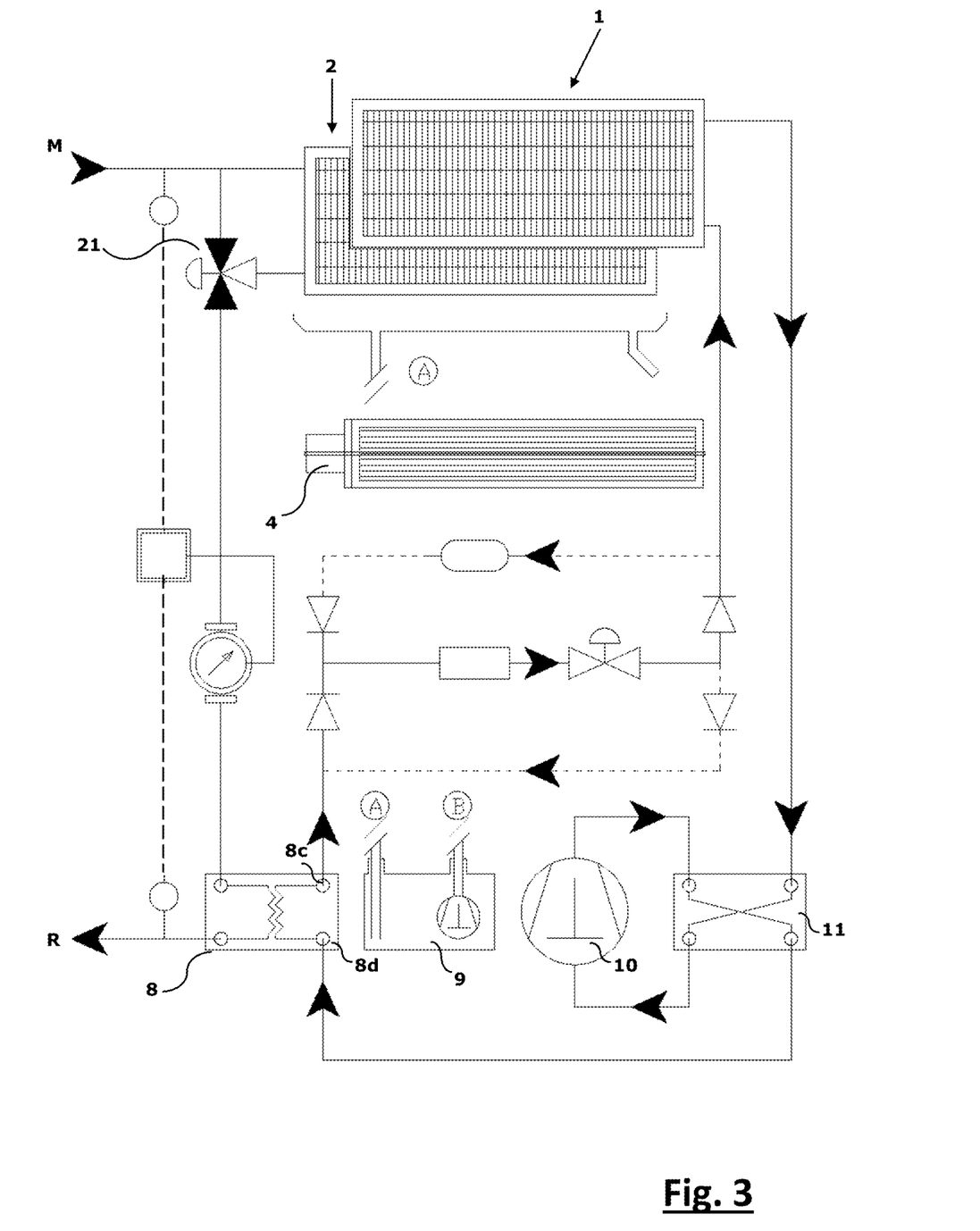
FIG. 3 shows the same system diagram of FIG. 1, in conditions of use for a summer cooling cycle.

FIG. 3 shows the operating condition typical of the summer phase, in conditions of use of the cooling cycle. Service is fully ensured by the section with refrigerating fluid of the active fan coil unit according to the invention, wherein the heat well made up of the primary heat exchange fluid circulating in the third plate heat exchanger 8 is exploited.

As a matter of fact, in this operating mode, the primary heat exchange fluid is caused to circulate at low temperature, such term indicating a temperature just above the room dew point, for example not below 25° C. In the contest of the present description, the term "just above the dew point temperature" means a temperature which is 1-15° C., preferably 2-8° C., above the actual dew point of the environment. The circulating network is hence used to cause the fluid to circulate at this low temperature within the third heat exchanger 8: as shown in FIG. 3, valve 21 is closed so that the primary fluid circulates between supply M and return R without entering the second heat exchange batch 2 (useful only in winter regimen). As regards the central unit, in the described operating conditions the sole production systems of cold fluid (water refrigerators/heat pumps) are maintained active, which allow the central unit to act as heat well at the suitable temperature (above dew point).

Although the temperature of the primary fluid is not very low—to thoroughly prevent, as desired, room air vapour condensation from occurring, with the related disadvantages on concrete works (walls and floor)—the flow rate of the fluid nevertheless ensures a high calorie subtraction capacity which configures it as heat well.

Preferably, in these conditions the primary heat exchange fluid is maintained at a temperature ranging between 25 and 35° C., preferably of 30° C. In order to always have the primary heat exchange fluid at the lowest possible temperature compatibly with the current environment conditions—the system is preferably provided with a dew temperature detector (not shown), connected to the central unit so as to drive the operation thereof and obtain the delivery in the circulating network of a primary fluid at the correct temperature.

In the cooling regimen, the four-way valve 11 of the refrigerating liquid section is set so that, along the fluid movement direction, the first heat exchanger batch 1 is arranged downstream of lamination valve 7: thereby, exchanger 1 acts as evaporator and hence subtracts heat from the environment air in contact therewith.

In particular, with reference to FIG. 3, plate heat exchanger 8 is maintained at a low temperature (in any case above dew point) through the circulating primary fluid. The refrigerating fluid is pushed into the liquid state, by compressor 10, into secondary outlet port 8*d* and comes out, at lower temperature, from secondary inlet port 8*c*. The fluid then flows through lamination valve 7 and is led to expand in the first heat exchanger batch 1. During the expansion until the gaseous phase, the refrigerating fluid subtracts heat from heat exchanger 1, as in a traditional refrigerating cycle. The air which laps exchanger 1, aided by fan 4, cools down and tends to condensate: condensation water is collected by collection basin 3 and hence sent to tank 9. Said tank provides to the collection/disposal of the condensation water produced in operating conditions; more precisely, this system may consist, depending on suitability, of a discharge device connected by gravity to a water disposal network, of a condensation water relaunching pump to the closest discharge network, of an injection pump injecting condensation water into thermo hydraulic networks, or of a condensation water collection tank with manual emptying provided with a level detection device, apt to stop operation upon reaching fullness.

The refrigerating fluid in the gaseous state comes out of the first heat exchanger batch 1 and, through valve 11, is compressed by compressor 10 to be reintroduced again into the third heat exchanger 8 and continue the refrigerating cycle.

Cooling/Heating in the Intermediate Cycle

Figure 4:
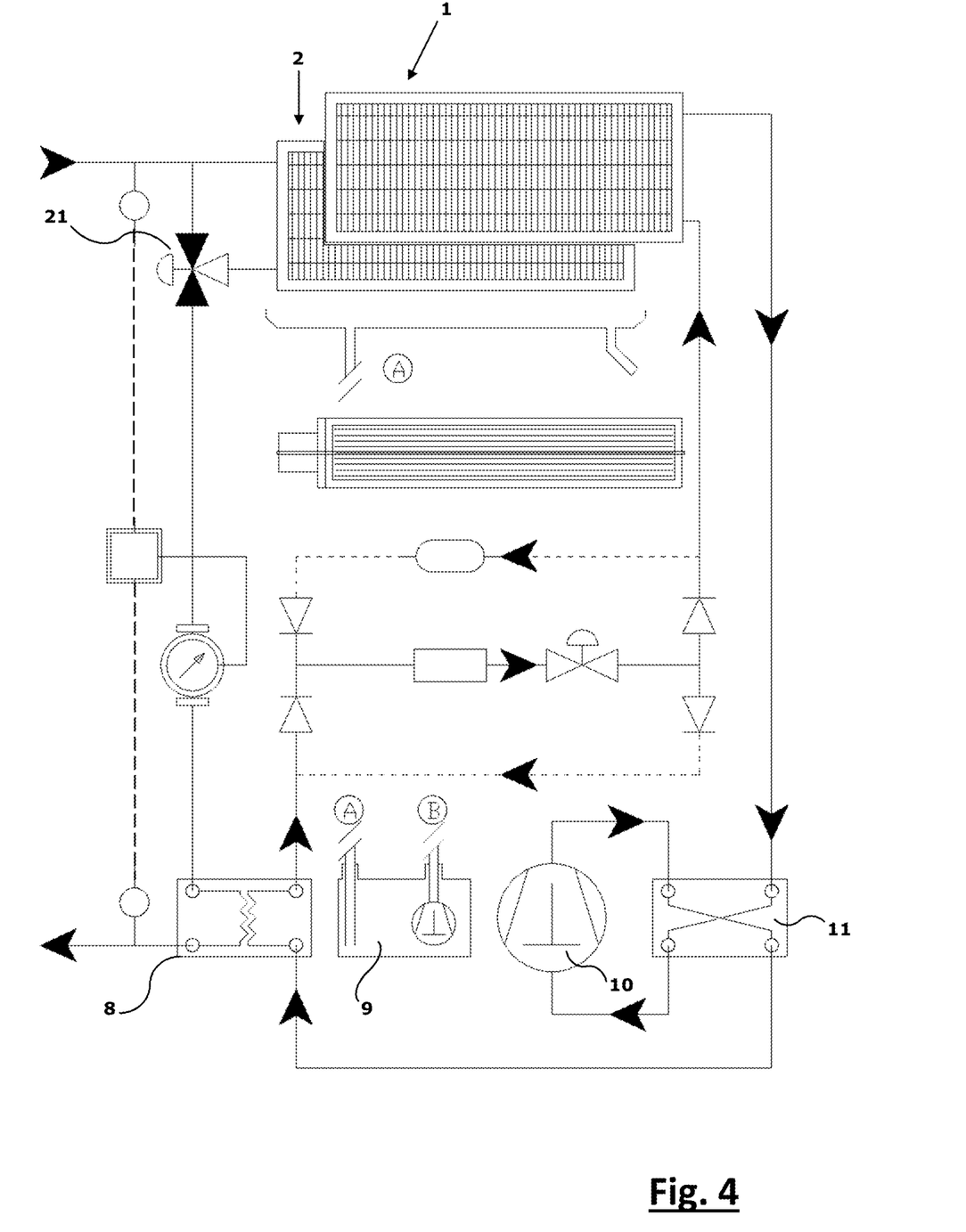
FIGS. 4 and 5 show the same system diagram of FIG. 1, in conditions of use for an intermediate cycle in cooling phase and in heating phase, respectively.
Figure 5:
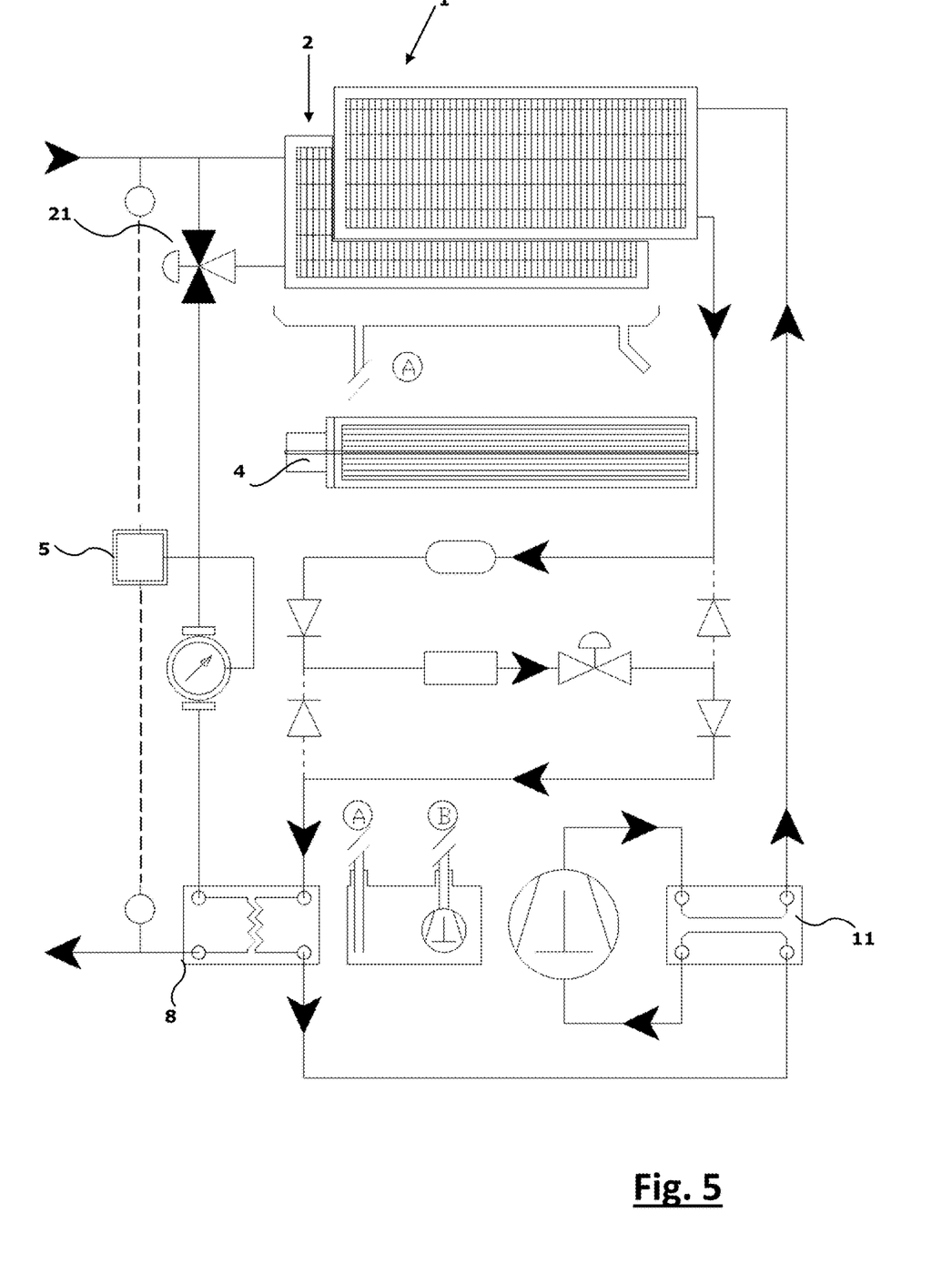

FIGS. 4 and 5 show the operating conditions typical of the autumn and spring seasons, when varying requests for cooling or heating may occur, even at the same time.

In both cases, the primary heat exchange fluid is caused to circulate at low temperature, excluding the second heat exchanger batch 2 through opening/closing valve 21.

The operation of the central unit is carried out at a suitably moderate temperature.

The interaction with the active fan coil unit allows, in an independent way for each of the apparatuses located in the building rooms, to produce heating and/or cooling depending on the specific, individual requirement of each room.

The primary heat exchange fluid given back to the central unit through the return branch R of each peripheral unit will be, depending on cases, hotter or colder than the fluid received by the central unit: in a theoretical condition of perfect equilibrium (50% users use hot, 50% users use cold), the central unit would act only as balancer (less the losses of the circulating network) and the same would not be required to integrate heat, with evident economic advantages.

Based on the above-reported description, now the significant advantages of the proposed solution are evident.

Firstly, since the primary heat exchange fluid never drops below the dew temperature, it is possible to use a pre-installed existing water circulating network, between the central source unit/heat well and the individual peripheral units of the active fan coil unit. That makes possible renovation actions of the air-conditioning system without significant actions on the existing concrete works.

Although the temperature of the primary fluid does not drop below a temperature of the order of 25-30° C., the mass of this fluid and the flow rate thereof in the circulating network ensures a high calorie removal capacity, which makes effective and energetically efficient the operation of the peripheral units in a cooling regimen. The energy efficiency of the peripheral units causes a minimum of localised energy to be necessary (equal to the operating energy of the compressor), which minimises the electric load impact in the different rooms to be air-conditioned.

Within entire buildings, but also within the individual real estate properties, the application of active fan coil units may occur also "here and there", that is, without the obligation of equipping each and any terminal point of the pre-installed existing hydraulic system. The existing terminal units may continue to operate as in the original system (typically as radiators or radiating panels during the winter regimen), next to the new active fan coil units which have the innovative flexibility of operating in the different climate regimens.

A single circulating network of the primary heat exchange fluid, within a single housing unit, but especially within an entire building (condominium) or a plurality of buildings, allows to compensate heating/cooling requirements differentiated between the individual peripheral units, during the intermediate climate season. The circulating primary low-temperature fluid, as a matter of fact, allows to remove or to supply calories depending on the operating mode set on the specific peripheral unit. The central unit balances these requests, possibly acting (cooling or heating the primary fluid, depending on cases) for the missing energy part.

Regardless of the intermediate season, the system according to the invention nevertheless allows energy recovery: when the system is equipped with central fluid production systems, both cold and hot fluid, which provide the use of reversible cooling and heating units actuated by a heat pump, in the operating period in summer cooling regimens (condition of FIG. 3), it is possible to accomplish a heat recovery cycle. For example, in such regimen the hot thermal energy removed by the active fan coil units may suitably be:

used in a direct cycle for the heating of sanitary hot water (if and when present), or other equivalent service, stored in the ground through geothermal probes, so as to be made available for the subsequent winter heating period.

Operating costs may easily be split based on actual individual consumption. The thermal energy produced and supplied by the central unit to each active fan coil unit is accounted through direct measuring performed by calorie counter 5; in order to collect useful and necessary elements for the administrative management of the services/expenses of the shared part, the accounting occurs punctually by distinctly taking into account hot-energy and cold-energy deliveries.

The energy consumption which is due to the operation of the active fan coil unit (electric energy for the fan, for the compressor and for any condensation water pumps) are instead borne directly by the owner of the air-conditioned rooms and it is hence not necessary for them to be accounted in the common administrative management.

However, it is understood that the invention must not be considered limited to the special arrangement illustrated above, which makes up only an exemplifying embodiment thereof, but that different variants are possible, all within the reach of a person skilled in the field, without departing from the scope of protection of the invention, as defined by the following claims.

For example, a simplified version of the active fan coil unit may be assumed, with fewer components and corresponding lower performance, which is capable, for example, of guaranteeing exclusively the hydronic heating and summer cooling regimens, but not the aid of the heat pump (hence omitting the parts necessary to the inversion of the refrigerating cycle through the heat pump, such as the four-way valve, the hydraulic flow-inversion circuitry and other adjusters).

The invention claimed is:

1. An assembly of an air-conditioning system and a pre-installed heating system, the air-conditioning system being configured to be installed on the pre-installed heating system, the assembly of the air-conditioning system and the pre-installed heating system comprising:
    a circulating network of a primary heat exchange fluid between a central unit and a plurality of peripheral units exchanging heat with environment air,
        said central unit comprising a heat adjusting device configured to heat-adjust said primary heat exchange fluid in a range between a hot temperature and a cold temperature, said cold temperature being above a dew temperature,
        said plurality of peripheral units comprising active fan coil units, comprising
            a refrigerating fluid section, with a closed circuit in which a first set of fluid to air heat exchangers is inserted, and
            a heating section with a second set of fluid to air heat exchangers, a supply portion and a return portion of said circulating network, in which said primary heat exchange fluid circulates, being connected to said second set of heat exchangers and to a third fluid to fluid heat exchanger connected to the closed circuit of said refrigerating-fluid section; and
    a valve configured to allow or prevent the circulation of the primary heat exchange fluid in the second set of heat exchangers, the valve being closed when the temperature of the primary heat exchange fluid is 1° C. to 15° C. above the current dew temperature, so that the primary heat exchange fluid flows into the third fluid to fluid heat exchanger without entering the second set of heat exchangers.

2. The assembly as claimed in claim 1, wherein said closed circuit of the refrigerating-fluid section further comprises, in sequence, a lamination valve, said third fluid to fluid heat exchanger, and a compressor.

3. The assembly as claimed in claim 2, wherein said refrigerating-fluid section further comprises a switching valve configured to switch the direction of the refrigerating fluid in the closed circuit to cause the refrigerating fluid to flow into said first set of heat exchangers upstream of said lamination valve of the refrigerating fluid to perform a heating heat pump cycle or downstream of the lamination valve to perform a refrigerating cycle.

4. The assembly as claimed in claim 1, further comprising:
    a calorie detector disposed between a supply terminal and a return terminal of said supply portion and return portion.

5. The assembly as claimed in claim 1, further comprising a supplementary fan configured to increase the heat exchange with the environment air in the proximity of said first and second sets of heat exchangers.

6. The assembly as claimed in claim 1, further comprising a temperature detector configured to detect the dew point temperature in the environment air and to control a heat adjustment action of said central unit so that the low temperature of said primary heat exchange fluid is continuously adjusted to be kept above the dew temperature.

7. The assembly as claimed in claim 1, wherein the active fan coil units further comprise an active treatment system in communication with the first set of fluid to air heat exchangers, the active treatment system comprising a lamination valve and a compressor.

8. The assembly as claimed in claim 2, further comprising:
    a calorie detector disposed between a supply terminal and a return terminal of said supply portion and return portion.

9. The assembly as claimed in claim 3, further comprising:
    a calorie detector disposed between a supply terminal and a return terminal of said supply portion and return portion.

10. The assembly as claimed in claim 2, further comprising a supplementary fan configured to increase the heat exchange with the environment air in the proximity of said first and second sets of heat exchangers.

11. The assembly as claimed in claim 2, further comprising a temperature detector configured to detect the dew point temperature in the environment air and to control a heat adjustment action of said central unit so that the low temperature of said primary heat exchange fluid is continuously adjusted to be kept above the dew temperature.

12. The assembly as claimed in claim 3, further comprising a supplementary fan configured to increase the heat exchange with the environment air in the proximity of said first and second sets of heat exchangers.

* * * * *